May 18, 1954    C. G. McMULLEN    2,679,042
MOVING TARGET INDICATOR FOR RADIO-OBJECT LOCATION SYSTEMS
Filed Feb. 19, 1946
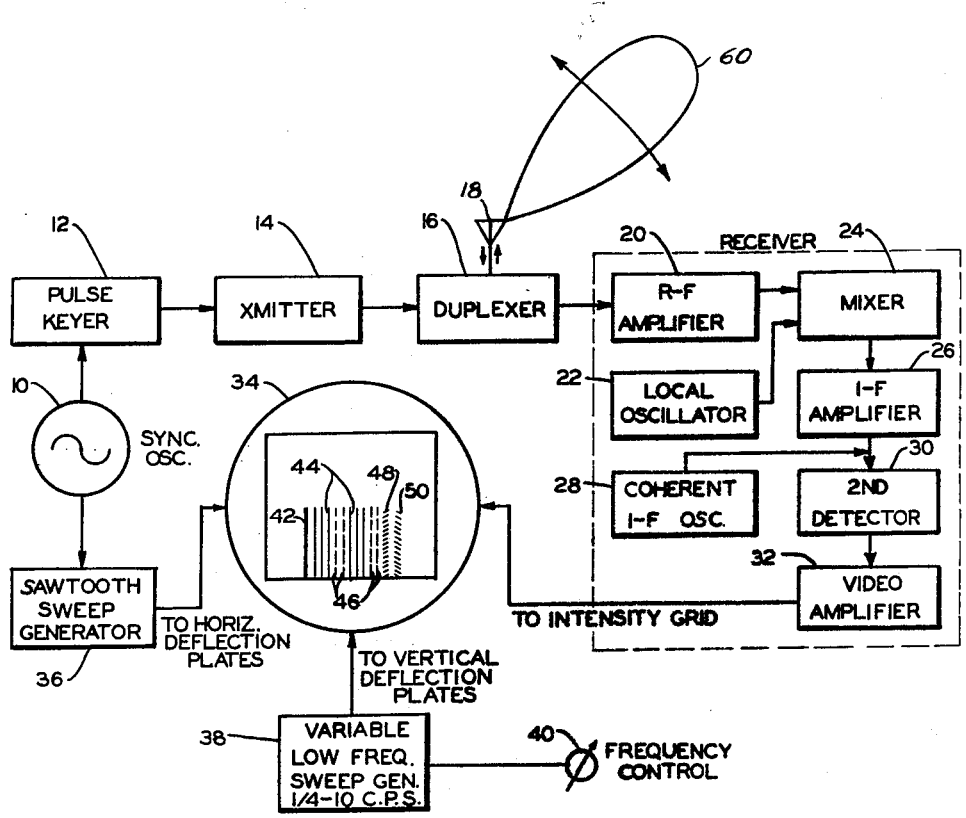
INVENTOR.
CHARLES G. McMULLEN
BY
William D. Hall
Attorney Patented May 18, 1954

2,679,042

UNITED STATES PATENT OFFICE 2,679,042

MOVING TARGET INDICATOR FOR RADIO-OBJECT LOCATION SYSTEMS

Charles G. McMullen, Garrison, Md., assignor to the United States of America as represented by the Secretary of War Application February 19, 1946, Serial No. 648,807

6 Claims. (Cl. 343—7.7)

(Granted under Title 35, U. S. Code (1952), sec. 266)

The invention described herein may be manufactured and used by or for the Government for governmental purposes, without the payment to me of any royalty thereon.

My invention relates to signal indicators, and particularly to a novel indicator for distinguishing between signals of fixed and varying amplitudes. Although not restricted thereto, my invention is particularly suitable for use as an indicator in pulse-echo, object-locating systems to distinguish between fixed and moving targets.

By mixing the received echoes of a transmitted pulse with the output of a stable oscillator which provides a reference signal of constant frequency and coherent in phase with the oscillations of the radiated wave trains, the resultant detected output will be of constant amplitude and polarity for fixed targets, while for moving targets the resultant output will be continuously changing in amplitude and polarity.

Prior methods of displaying such signals involve the use of an oscilloscope in which a time base is provided by horizontally deflecting the cathode-ray trace in timed relation with the transmission of each pulse. Received echoes are used to vertically deflect the trace to provide vertical pips of a height proportional to the amplitude of the echoes. Therefore, the height of the pips is constant for fixed targets, and continuously varies above and below the base line for moving targets. This method of indication is unsatisfactory where a plurality of echoes from moving targets are received, because it is difficult for the operator to distinguish between systematic variations, which are due to movement of the target, from random variations due to other causes. Moreover, if the rate of amplitude variation exceeds the persistence of vision factor, the signal pip appears of constant height even for varying signals.

It is a principal object of my invention to provide a novel oscilloscope display for signals of the type above discussed.

It is a further object of my invention to provide an oscilloscope display for signals of fixed and varying amplitude in which a substantially steady, characteristic indication is provided for both types of signals, thereby facilitating observation and interpretation of the signals and resulting in less fatigue to the operator.

Another object of my invention is to provide an oscilloscope display which makes possible the differentiation between signals of constant and varying amplitude, even if the rate of variation of the latter is above the persistence of vision factor.

For a better understanding of the invention, together with other and further objects thereof, reference is had to the following description taken in connection with the single figure of the accompanying drawing, which shows a block diagram of the invention.

In the drawing, there is shown a preferred embodiment of my invention comprising a radio pulse transmitter 14 which is periodically keyed under the control of a relatively-low frequency, sine wave, synchronizing oscillator 10 usually operating in the audio frequency region. The output of oscillator 10 is applied to a pulse keyer 12 which, at each cycle from oscillator 10, generates sharp pulses of short duration spaced at intervals of considerably longer duration. The pulses from keyer 12 intermittently render operative the normally-blocked, radio transmitter 14 which generates spaced, radio-frequency wave trains of a duration substantially equal to that of said pulses, generally from 1–30 microseconds. As is well known, the pulse intervals are dependent upon the maximum target ranges to be measured.

The output of the transmitter is radiated by an antenna 18, which is usually a unidirectional array providing a movable directional radiation pattern 60. Echoes are also received on said antenna and impressed upon the receiver. Both the transmitter and receiver are coupled to the antenna through a duplexer 16 which couples the antenna to the transmitter and decouples it from the receiver during pulse transmission, and couples the antenna to the receiver and decouples it from the transmitter during reception. The receiver is preferably of the superheterodyne type and includes a radio frequency amplifier 20, a local oscillator 22, a mixer 24, an intermediate frequency amplifier 26, a second detector 30, and a video amplifier 32. In the detector 30, the intermediate frequency output of amplifier 26 is mixed with the output of a coherent oscillator 28 which is stable in frequency and may be tuned exactly to the intermediate frequency. Alternatively, oscillator 28 may be slightly detuned from the intermediate frequency, provided that it supplies a wave of constant reference phase with respect to the intermediate-frequency wave trains. If the echoes arrive from a fixed target, the frequency, and hence the phase, thereof will be constant, and the resultant of these echo waves mixed with the output of oscillator 28 will be of relatively fixed amplitude. On the other hand, when the echoes are received from a moving target, the received waves will be characterized by a progressive change in phase with respect to the transmitted signal, which is equivalent to a frequency shift. This phenomenon is the well known Doppler effect.

This signal of changing phase, when mixed with the constant reference phase of coherent oscillator 28, yields in the output of detector 30 a demodulated pulse signal which continuously changes in amplitude and polarity and exhibits a sinusoidal variation in amplitude, i. e., an amplitude modulation, of a frequency depending upon the radial velocity of the moving target. This signal is then amplified by video amplifier 32 and applied to the intensity grid of an oscilloscope tube 34, only the screen of which is represented in the drawing. Preferably, said screen is of the high-persistence type. An incoming signal will brighten or darken the cathode-ray beam depending upon its intensity and polarity.

Synchronizing oscillator 10 also controls a sawtooth sweep generator 36. At every cycle of output of oscillator 10, and hence every time a pulse from transmitter 14 is radiated, generator 36 provides a sawtooth wave which is applied to the horizontal deflecting plates of oscilloscope tube 34 to provide a time base.

As thus far described, the transmitted pulses and the echoes thereof will appear in the receiver output and vary the beam intensity to cause a dot or line of great or lesser brightness to appear on the screen, the separation between the dots due to the transmitted pulses and the dots due to the echoes depending, as is will known, upon the slant range of the target. The transmitted signals and echoes from fixed targets will produce dots of constant brightness. Echoes from moving targets will produce dots of continuously changing brightness.

To make the display of the dots of continuously changing brightness more evident, the entire time base, in this case the horizontal trace, is relatively slowly moved along another axis, in this case in the vertical direction. This is done by applying to the vertical deflection plates of the oscilloscope the output of a low frequency, sawtooth wave generator 38, preferably having a control 40 to vary its frequency.

Vertical movement of the time base will cause the signal dots to trace vertical lines on the screen. As a result, the transmitted signal and fixed echoes signals will generate lines of uniform brightness, as shown respectively at 42 and 44. Echoes from moving targets will, due to their continuously changing amplitude, generate lines which vary in brightness along the length thereof, so that they have a dotted or beaded appearance, as roughly indicated by dotted lines 46. In some cases, to be discussed below, the line indications will be composed of slanting striations simulating a herringbone pattern. The difference between fixed and moving echo indications is striking, thus facilitating recognition and thereby making it possible to keep track of all signals with a minimum of fatigue.

The effective speed of the vertical sweep should preferably be slow, and may be unsynchronized, relative to the horizontal sweep. Preferably, the period of said vertical sweep, which of course depends upon the period of the slow-sweep generator 38 is from two to fifty times the period of the Doppler modulation characteristic of the moving echoes. Substantially the same effect can be obtained by a vertical sweep frequency which is equal to the pulse repetition frequency, or a multiple thereof, plus or minus a low frequency which is intended to correspond to the effective vertical sweep frequency desired.

In general, the appearance of the oscilloscope indication for a Doppler modulation frequency $F_m$ will be the same as the appearance for a frequency $F_m$ plus $NF_p$; where $F_p$ is the pulse repetition frequency, and N is any integer. Moving targets will be distinguishable so long as $F_m$ is not equal to $NF_p$. In the region where $F_m$ is approximately equal to $KF_p/2$, where K is any odd integer, the distinction between fixed and moving targets will be good if the effective vertical sweep rate is such that the separation between successive pulse indications are distinguishable on the screen.

For best results the reference phase of the initial oscillation of each wave train generated by transmitter 14 should be held constant with respect to the oscillations of local oscillator 22 and coherent oscillator 28. This can be accomplished by stabilizing the frequencies of these oscillators by any of the methods known in the art. One eminently satisfactory method of doing this is to make the frequencies of these oscillators harmonically related to each other and by using selected harmonics of a single crystal oscillator as the local oscillation frequency applied to mixer 24, as the coherent oscillation frequency applied to second detector 30, and as a frequency-stabilizing signal to be injected into a tuned circuit of the oscillator in transmitter 14.

It is, however, not absolutely essential that the resonant frequency of the coherent oscillator 28 be exactly tuned to the intermediate frequency or the radio frequency, as the case may be, provided that the difference between the phase angle of the initial cycle of the transmitted voltage wave train at any time $T_1$, measured from time of initiation of any transmitted pulse, and the phase angle of the coherent oscillations at any time $T_2$, measured from the same index, is always constant. Under these conditions, if the resonant frequency of the coherent oscillations is made slightly different from the frequency of the pulse oscillations, it is possible, by means of the novel indicator described herein, to determine whether the target is receding or advancing. Under the above conditions, the vertical lines on the oscilloscope screen will be composed of slanted striations, the slant being in one direction, as shown at 48, when the target is receding, and in the opposite direction, as shown at 50, when the target is advancing.

It will be understood that the usual means will be provided for adjusting the electrode potentials of the oscilloscope tube 34 and for blanking the return traces of the cathode-ray beam.

From the above description it will be appreciated that my invention provides a novel indicator for differentiating between pulse signals of fixed and varying amplitude, or any other varying characteristic which can be converted into a varying amplitude characteristic, and is particularly suitable for use with an object-detection system incorporating a coherent oscillator for detecting the Doppler modulation characteristic of the echoes from a moving target. This is done by utilizing three "dimensions" which control the display on an ordinary cathode-ray tube. One dimension is used for the time base (or range sweep), another dimension is the beam intensity which is controlled by the receiver output, and the third dimension is the continuous displacement of the time base along a different axis to facilitate observation of the Doppler modulation.

The term "echo" as used herein is not to be restricted to signals which are reflected or passively reradiated by a body. This term is also used to signify any automatic response to a signal, e. g. that obtained by means of a normally inoperative transmitter located on said body, which, when keyed by a pulse transmitted toward said body, automatically functions to send an answering pulse, either on the same frequency as said transmitted pulse or on a different frequency.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

I claim:

1. In combination with a radio pulse-echo system having an antenna providing a movable directional radiation pattern and wherein echoes from a fixed target provide successive pulses of constant amplitude, and echoes from a moving target provide successive pulses of varying amplitude; means for indicating said targets comprising a cathode ray tube, means responsive to said pulses for controlling the beam intensity in said tube, a first periodic means for deflecting said beam along a first plane to provide a time base, and a second periodic means unsynchronized with the movement of said directional pattern for deflecting said beam along a second plane which is angularly disposed with respect to said first plane at a slower speed than the deflection of said beam along said first plane, the period of said second periodic means being considerably greater than that of said first periodic means.

2. In combination with a radio pulse-echo system having an antenna providing a movable directional radiation pattern and in which discrete radio pulses having a predetermined repetition period are radiated, and wherein echoes from a fixed target provide pulses of constant amplitude, and echoes from a moving target provide pulses characterized by an amplitude variation having a period dependent upon the radial velocity of said moving target; means for indicating said targets comprising a cathode ray tube, means responsive to said pulses for controlling the beam intensity in said tube, a first periodic means for deflecting said beam horizontally in timed relation with the radiation of each of said pulses, and a second periodic means unsynchronized with the movement of said directional pattern for deflecting said beam vertically at a slower speed than the horizontal deflection of said beam, the period of said second periodic means being considerably greater than that of said first periodic means.

3. In combination with a radio pulse-echo system having an antenna providing a movable directional radiation pattern and in which discrete radio pulses having a predetermined repetition period are radiated, and wherein echoes from a fixed target provide pulses of constant amplitude, and echoes from a moving target provide pulses characterized by an amplitude modulation having a period dependent upon the radial velocity of said moving target; means for indicating said targets comprising a cathode ray tube, means responsive to said pulses for controlling the beam intensity in said tube, a first periodic means for deflecting said beam horizontally in timed relation with the radiation of each of said pulses, and a second periodic means unsynchronized with the movement of said pattern for deflecting said beam vertically at a slower speed than the horizontal deflection of said beam, the period of said second periodic means being considerably greater than that of said first periodic means.

4. In a pulse-echo, object-detection system having means for intermittently radiating energy and means for receiving echoes thereof from targets, said receiving means including means for converting echoes from fixed targets into pulses of constant amplitude and for converting echoes from moving targets into pulses of varying amplitude: the combination therewith of means for indicating said pulses, said indicating means comprising a screen, means for projecting an indicating beam on said screen, means controlled by said pulses for varying the intensity of said beam as a function of the amplitude of said pulses, means for deflecting said beam along one coordinate of said screen in synchronism with recurrence frequency of said pulses, and means including a sweep generator for periodically deflecting said beam along a second coordinate of said screen at a slower speed than the deflection of said beam along said one coordinate, and at a frequency which is low compared to said recurrence frequency, the extent of said deflection along said second coordinate being unrelated to the direction of arrival of said echoes.

5. In a coherent pulse-echo system having means for intermittently radiating energy and means for receiving echoes thereof from targets, said receiving means including means for converting echoes from fixed targets into pulses of constant amplitude, and for converting echoes from moving targets into pulses of varying amplitude: the combination therewith of means for indicating said pulses, said indicating means comprising cathode ray tube indicator having a fluorescent screen, means for projecting a cathode ray beam on said screen, means controlled by said pulses for varying the intensity of said beam as a function of the amplitude of said pulses, means for deflecting said beam along one coordinate of said screen in synchronism with recurrence frequency of said pulses, and means including a sweep generator for periodically deflecting said beam along a second coordinate of said screen at a slower speed than said deflection along said one coordinate, and at a frequency which is low compared to said recurrence frequency, the extent of said deflection along said second coordinate being independent of the direction of arrival of said echoes.

6. In a coherent pulse-echo system having means for intermittently radiating, directional means for receiving echoes of said energy from targets, and adjusting means for varying the effective direction of said directional means, said receiving means including means for converting echoes from fixed targets into pulses of constant amplitude, and for converting echoes from moving targets into pulses of varying amplitude: the combination therewith of means for indicating said pulses, said indicating means comprising a cathode ray tube indicator having a fluorescent screen, means for projecting a cathode ray beam on said screen, means controlled by said pulses for varying the intensity of said beam as a function of the amplitude of said pulses, means for deflecting said beam along one coordinate of said screen in synchronism with recurrence frequency of said pulses, and means including a sweep generator independent of said adjusting means for periodically deflecting said beam along a second coordinate of said screen which is perpendicular to said one coordinate at a slower speed than said deflection along said one coordinate, and at a frequency which is low compared to said repetition frequency.

References Cited in the file of this patent

UNITED STATES PATENTS

| Number | Name | Date |
|---|---|---|
| 2,280,524 | Hansen | Apr. 21, 1942 |
| 2,403,625 | Wolff | July 9, 1946 |
| 2,406,316 | Blumlein et al. | Aug. 27, 1946 |
| 2,406,358 | Doba | Aug. 27, 1946 |
| 2,408,742 | Eaton | Oct. 8, 1946 |
| 2,412,291 | Schade | Dec. 10, 1946 |
| 2,422,182 | Bryant | June 17, 1947 |
| 2,465,113 | Norgaard | Mar. 22, 1949 |
| 2,514,924 | Becker | July 11, 1950 |
| 2,535,274 | Dicke | Dec. 26, 1950 |
| 2,581,847 | Espenchied et al. | Jan. 8, 1952 |